United States Patent
Ashcroft et al.

(10) Patent No.: US 7,346,667 B2
(45) Date of Patent: Mar. 18, 2008

(54) SYSTEM FOR DELIVERING DYNAMIC CONTENT

(75) Inventors: Stephen Ashcroft, London (GB); Andrew Witney, Tewkesbury (GB); Ian Malpas, Basel (CH)

(73) Assignee: UBS AG, Zurich (CH)

( * ) Notice: Subject to any disclaimer, the term of this patent is extended or adjusted under 35 U.S.C. 154(b) by 669 days.

(21) Appl. No.: 09/919,727

(22) Filed: Jul. 31, 2001

(65) Prior Publication Data

US 2002/0184343 A1 Dec. 5, 2002

Related U.S. Application Data

(60) Provisional application No. 60/294,728, filed on May 31, 2001.

(51) Int. Cl.
*G06F 15/16* (2006.01)
*G06F 1/12* (2006.01)

(52) U.S. Cl. .................. 709/219; 709/227; 709/230; 719/318

(58) Field of Classification Search ........ 709/200–203, 709/217–219, 227, 230; 715/749; 717/118; 719/318
See application file for complete search history.

(56) References Cited

U.S. PATENT DOCUMENTS

| | | | | |
|---|---|---|---|---|
| 6,012,098 A * | 1/2000 | Bayeh et al. | ........... | 709/246 |
| 6,289,382 B1 | 9/2001 | Bowman-Amuah | ........ | 709/226 |
| 6,311,165 B1 | 10/2001 | Coutts et al. | ........... | 705/21 |
| 6,332,163 B1 | 12/2001 | Bowman-Amuah | ........ | 709/231 |
| 6,339,832 B1 | 1/2002 | Bowman-Amuah | ........ | 714/35 |
| 6,591,272 B1 * | 7/2003 | Williams | ........... | 707/102 |
| 6,697,815 B1 * | 2/2004 | Wilson | ........... | 707/102 |
| 6,718,515 B1 * | 4/2004 | Conner et al. | ........... | 715/509 |
| 6,779,152 B1 * | 8/2004 | Conner et al. | ........... | 715/509 |
| 6,779,155 B1 * | 8/2004 | Bahrs et al. | ........... | 715/526 |
| 7,072,934 B2 * | 7/2006 | Helgeson et al. | ........... | 709/203 |
| 2002/0049703 A1 | 4/2002 | Bandhole et al. | ........... | 709/104 |
| 2002/0130899 A1 * | 9/2002 | Ryan et al. | ........... | 345/738 |
| 2003/0078960 A1 * | 4/2003 | Murren et al. | ........... | 709/203 |

OTHER PUBLICATIONS

Applying Enterprise JavaBeans—Architecture & Design, Colyer, et. al., IBM UK Ltd, 2000, p. 1-17.*

Supporting Interactive Collaboration on the Web with CORK, Isenhourm et. al., Center for Human-Computer Interaction, Dept. of Computer Science, Virginia Tech, 2000, p. 1-16, downloaded from http://linc.cs.vt.edu/papers/2000/IsRoCa2000-CORK_IwC_Pre-Print.*

(Continued)

*Primary Examiner*—Zarni Maung
(74) *Attorney, Agent, or Firm*—Proskauer Rose LLP (57) ABSTRACT

A method and system for presenting a requested web page selected from a plurality of web pages is provided and includes the step of performing at least one processing task associated with the requested web page. Next, at least one content bean for retrieving content required for the requested web page is invoked. Next, the content required for the requested web page is stored in at least one model bean. Next, the content from said at least one model bean is received. Next, at least one view bean for rendering said requested web page is invoked. Finally, the requested web page including the content is presented.

31 Claims, 2 Drawing Sheets

OTHER PUBLICATIONS

The Emergence of Distributed Component Platforms, Krieger & Adler, Computer Sciences Corp., Mar. 1998, IEEE 0018-9162/98, p. 43-53.*

Building Dynamic Web Applications with Servlets and JavaServer Pages, Stalman, R. Oracle Corp., ODTUG 2000, p. 1-16.*

Simplified Guide to the JAVA 2 Platform, Enterprise Ed.,Sun Microsystems, Inc. ,Simplified Guide to J2EE, Sep. 1999, 25 pages.*

Enterprise Developer, Professional JSP, Wrox Press Ltd, 1999, p. 1-37.*

Schmidt, Enabling Next-Generation Enterprises, eAI Journal, Jul./Aug. 2000, p. 75-80.*

Teachers Assistant: A web-based Application using Java Server Pages and Java Database Connectivity, Barua, S., IEEE 0-7803-6583-6, 2000, p. 828-833.*

The Five-Module Framework for Internet Application Development, Ebner, E., et. al., ACM 0360-0300, 2000, p. 1-7.*

A Reference Architecture of Component Based Development, Collins-Cope, M., et. al., Architecture Reference Model, Oct. 19, 2000, p. 1-12.*

WebSphere as an e-business server, Ferguson & Kerth, IBM Systems Journal, vol. 40, No. 1, 2001, p. 25-45.*

Int'l Search Report dated Sep. 3, 2002 for PCT/US02/17066.

M. Welsh et al., "SEDA: An Architecture for Well-Conditioned, Scalable Internet Services", *Scalable Internet Services*, Oct. 2001, pp. 230-243.

WebSphere Application Server Enterprise Edition: TXSeries Building Business Solutions with WebSphere; Version 3.5, Document No. SC09-4432-01, Second Edition, Jun. 2000.

* cited by examiner

FIG. 1

PRIOR ART

FIG. 2

SYSTEM FOR DELIVERING DYNAMIC CONTENT

This application claims the benefit of the filing date of U.S. provisional application Ser. No. 60/294,728 entitled "Method For Developing Java Applications" which was filed on May 31, 2001.

BACKGROUND

The following invention relates to a system and method for providing information and, in particular, to a system for serving dynamic content in a web environment.

Prior art techniques exist for presenting content to a requesting client browser. A particular technique implements a Model-View-Controller ("MVC") architecture that separates the presentation of content from the actual application data. In the MVC architecture, a model component represents the application data and methods that operate on that data. A view presents the data to a requesting user. A controller component translates user actions into operations on the model. The model component, in turn, updates the view to reflect changes to data.

Figure 1:
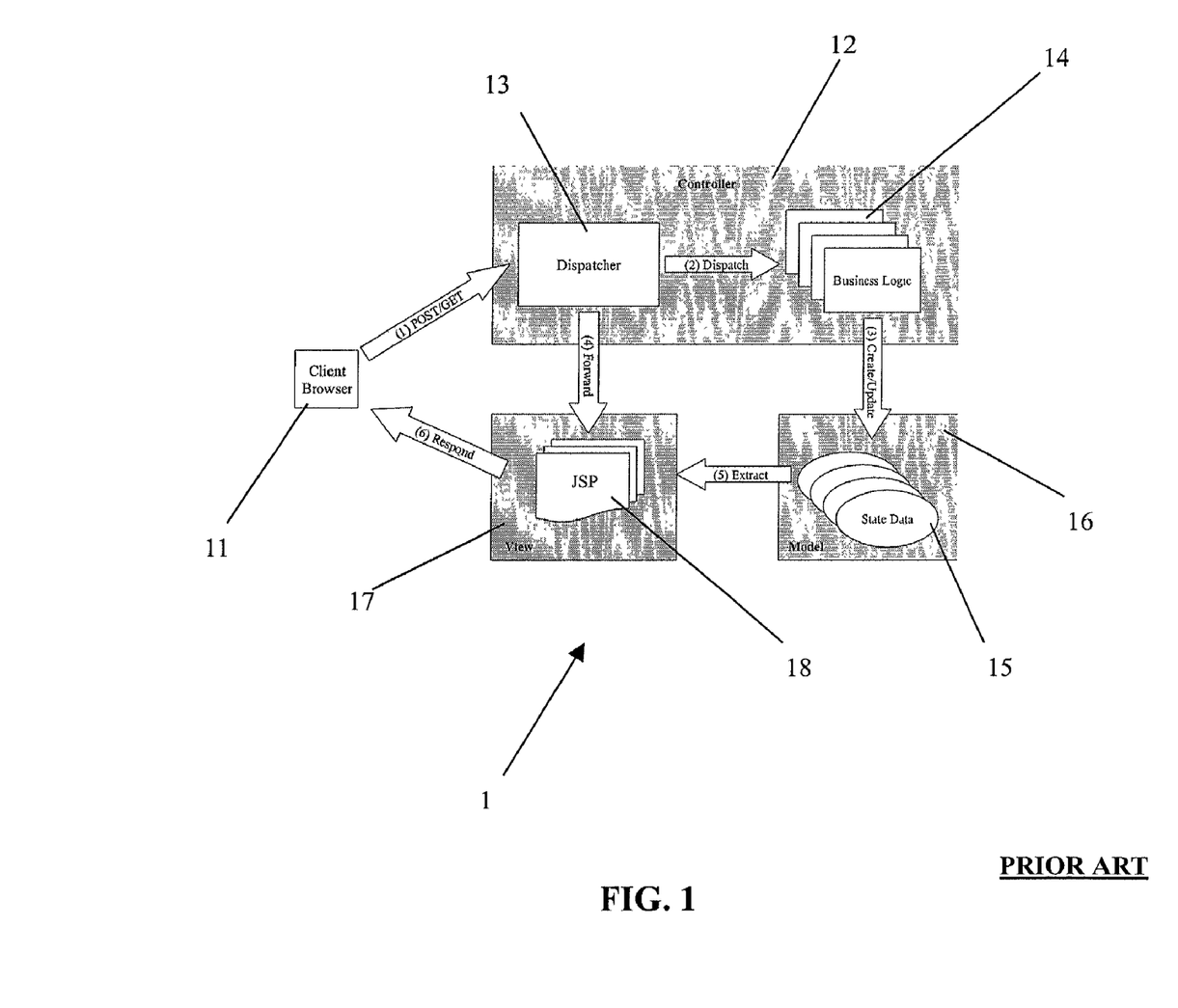
FIG. 1 is a system that employs a prior art Model 2 MVC architecture for presenting dynamic content.

Referring now to FIG. 1, there is shown a system 1 that employs a Model 2 MVC architecture for presenting dynamic content to a requesting web browser using JavaServer Pages ("JSP") technology. JSP technology facilitates the separation of the user interface from content generation thereby enabling designers to change the overall page layout without altering the underlying dynamic content (see http://java.sun.com/products/jsp/.)

In particular, a request for a particular web page is initially submitted by a client browser 11 to a controller 12. Controller 12 includes a dispatcher 13 that identifies the requesting user, determines the page being requested, establishes the context of the request and invokes one of a plurality of business logic handlers 14 to process the request. The selected business logic handler then initiates the processing required to satisfy the client's page request including interacting with backend systems to retrieve or modify some persistent state. When the processing is completed, the business logic handler then creates and/or modifies state data 15 that is stored by a model component 16. Business logic handler then passes control back to controller 12.

Controller 12 then determines which of a plurality of JSPs 18, maintained by a view component 17, to invoke for presenting the results to the requesting client. The selected one of JSPs 18 then renders the requested page as HTML. In the event the selected one of JSPs 18 requires application data for inclusion in the page, it extracts such data directly from state data 15 maintained by model component 16 that has previously been setup by one of business logic handlers 14. Once the page is rendered, the selected one of JSPs 18 presents the page to the requesting client browser for display.

Typically, there is a single instance of the controller per each web application that services all requests for pages from the web application. In order to handle multiple simultaneous requests, the controller multi-threads so that multiple client requests can be processed concurrently.

A drawback exists with respect to the prior art Model 2 architecture in that each page that is to be served by the web application requires a unique business logic handler for processing state data and a unique JSP for presenting the resulting page to the requesting client browser. Requiring a unique business logic handler and JSP for each web page drastically increases the development effort required to create and maintain a web-based application, especially as the number of web pages to served by the application is large. Furthermore, because different business logic handlers and different JSPs that perform similar tasks, albeit for different pages, may be written by different developers, inconsistencies and errors may easily occur. In addition, because similar program code may replicated across numerous business logic handlers and JSPs that perform similar tasks, updating such code is time-consuming and prone to error. Thus, because the prior art Model 2 architecture requires a significant amount of code sharing between different business logic handlers and different JSPs, the development and maintenance of the prior art architecture is costly and inefficient.

Accordingly, its is desirable to provide an architecture for serving dynamic content that improves the efficiency and reduces the overhead costs associated with prior art architectures.

SUMMARY OF THE INVENTION

The present invention is directed to overcoming the drawbacks of the prior art. Under the present invention a system is provided for presenting a requested web page selected from a plurality of web pages. The system includes a plurality of handlers each performing at least one processing task associated with one of the plurality of web pages. At least one content bean being invoked by any of the plurality of handlers is included for retrieving content required for the one of the plurality of web pages associated with the any of said plurality of handlers. Also included is at least one model bean for storing the content. A plurality of views is included wherein each of the plurality of views associated with one of the plurality of web pages receives the content from the at least one model bean and presents the one of the plurality of web pages. Also included is at least one view bean being invoked by any of the plurality views for rendering the one of the plurality of web pages. Finally, a controller for receiving a request for the requested web page is included. When the controller receives the request, the controller invokes the one of the plurality of handlers associated with the requested web page for processing content required for the requested web page and the controller invokes the one of the plurality of views for presenting the requested web page.

In an exemplary embodiment, the request for the requested web page includes at least one parameter and the at least one processing task performed by at least one of the plurality of handlers includes validating the at least one parameter.

In another exemplary embodiment, the request for the requested web page is subsequent to a navigation and the at least one processing task performed by at least one of the plurality of handlers includes validating the navigation.

In yet another exemplary embodiment, at least one of the plurality of handlers directs the controller to cause a different web page to be presented.

In still yet another exemplary embodiment, at least one of the plurality of handlers directs the controller to invoke a different one of the plurality of views for presenting the requested web page.

In an exemplary embodiment, at least one of the handlers renders the requested web page.

In another exemplary embodiment, the controller presents the requested of web page.

In yet another exemplary embodiment, each of the plurality of handlers is multithreaded.

In still yet another exemplary embodiment, the at least one content bean receives content from at least one content system.

In an exemplary embodiment, the system has a first interface and the content system has a second interface and the at least one content bean translates between the first interface and the second interface.

In another exemplary embodiment, a plurality of content beans each having a function is included wherein the functions of the plurality of content beans are layered.

In yet another exemplary embodiment, a configuration file is included that includes a list of data objects for at least one of the plurality of web pages, and wherein the at least one content bean receives the list of data objects and retrieves the data objects in the list for inclusion in the at least one of the plurality of web pages.

In still yet another exemplary embodiment, the at least one of the plurality of web pages is modified by modifying the list of data objects.

In an exemplary embodiment, the configuration file includes authorization requirements for the requested web page and the handler verifies that the request for the requested web page satisfies the authorization requirements.

In another exemplary embodiment, each of the plurality of views is multithreaded.

In yet another exemplary embodiment, each of the plurality of views is formed using JSP technology.

In still yet another exemplary embodiment, the at least one view bean formats the one of the plurality of web pages into HTML.

In an exemplary embodiment, a language file storing text in a plurality of languages is included, the text being associated with a text label, and wherein at least one of the plurality of web pages includes the text label and the at least one view bean replaces the text label with the associated text in a selected one of the plurality of languages.

Under the present invention, a method for presenting a requested web page selected from a plurality of web pages is provided and includes the step of performing at least one processing task associated with the requested web page. Next, at least one content bean for retrieving content required for the requested web page is invoked. Next, the content required for the requested web page is stored in at least one model bean. Next, the content from said at least one model bean is received. Next, at least one view bean for rendering said requested web page is invoked. Finally, the requested web page including the content is presented.

In an exemplary embodiment, the request for the requested web page includes at least one parameter and the step of performing at least one processing task includes the step of validating the at least one parameter.

In another exemplary embodiment, the request for the requested web page is subsequent to a navigation and the step of performing at least one processing task includes the step of validating the navigation.

In yet another exemplary embodiment, the method includes the step of directing a different web page to be presented.

In still yet another exemplary embodiment, the at least one content bean receives content from at least one content system.

In an exemplary embodiment, the at least one content bean executes on a system having a first interface and the content system has a second interface and wherein the step of invoking at least one content bean for retrieving content includes the step of translating between the first interface and the second interface.

In another exemplary embodiment, a plurality of content beans each having a function and the functions of the plurality of content beans are layered.

In yet another exemplary embodiment, a configuration file is included, wherein the configuration file includes a list of data objects for the requested web page, and wherein the step of invoking at least one content bean for retrieving content required includes the steps of receiving the list of data objects and retrieving the data objects in the list for inclusion in the requested web page.

In still yet another exemplary embodiment, the method includes the step of modifying said requested web page by modifying said list of data objects.

In an exemplary embodiment, the configuration file includes authorization requirements for the requested web page and it is verified that the request for the requested web page satisfies the authorization requirements.

In another exemplary embodiment, the step of invoking at least one view bean for rendering the requested web page includes the step of formatting the requested web page into HTML.

In yet another exemplary embodiment, a language file storing text in a plurality of languages is included, the text being associated with a text label, the requested web page includes the text label, and wherein the step of invoking at least one view bean for rendering the requested web page includes the step of replacing the text label with the associated text in a selected one of the plurality of languages.

Accordingly, a system and method is provided for serving dynamic content that improves the efficiency and reduces the overhead costs associated with prior art architectures.

The invention accordingly comprises the features of construction, combination of elements and arrangement of parts that will be exemplified in the following detailed disclosure, and the scope of the invention will be indicated in the claims. Other features and advantages of the invention will be apparent from the description, the drawings and the claims.

DESCRIPTION OF THE DRAWINGS

For a fuller understanding of the invention, reference is made to the following description taken in conjunction with the accompanying drawings, in which.

DETAILED DESCRIPTION OF THE PREFERRED EMBODIMENTS

Figure 2:
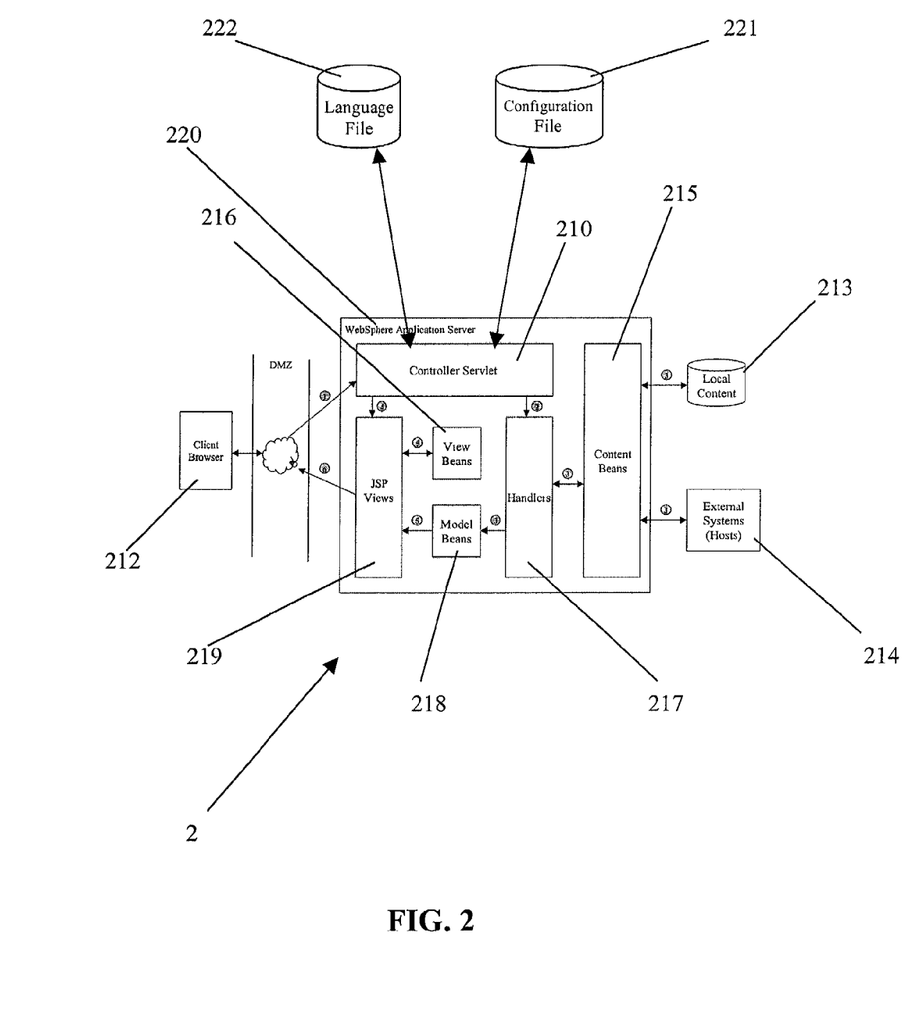
FIG. 2 is a block diagram of a system for delivering dynamic content according to the present invention.

Referring now to FIG. 2, there is shown a block diagram of a system 2 for delivering dynamic content according to the present invention. A client browser 212, that may be, for example, a personal computer running browser software, communicates with system 2 using any known communications protocol and method, such as, by way of non-limiting example, the Internet. Client browser 212 communicates with system 2 for the purpose of requesting a web page. Upon receiving the web page request, system 2 retrieves any content necessary for fulfilling the request from a local content database 213 and/or external systems 214. System 2 then presents the web page containing the content to client browser in a manner described below.

For example, system 2 may be operated by a financial institution that provides its clients with web access to the clients' account activity. In such a case, client browser 212 operated by a client having an account with the financial institution may request an account status that includes recent trade information stored in the financial institution's books and records. In response, system 2 retrieves the relevant information to fulfill the client's request and presents to client browser 212 a suitably formatted web page containing the requested information. Similarly, system 2 may be used to present to client browser 212 any other type of information.

System 2 includes a controller 210 which processes the web page requests received from client browser 212. Upon receiving a request, controller 210 determines which page was requested by client browser 212 and the context of the particular request. The request context may include various factors such as, by way of non-limiting example, the identity of the requesting user, the user's preferences, such as language preferences, and any conversational state that has been setup for that user. Controller 210 then associates the context with the underlying HTTP Session that initiated the request so that everything that takes place in the processing of a particular request can always be attributed to the requesting user.

In addition to maintaining user context information, controller 210 maintains context information that relates to each particular request by a client that may include, by way of non-limiting example, the name of the current web page being processed, the name of the original web page requested (in the case of page forwarding) or the success/failure status thus far of the current request. By maintaining request context information, controller 210 is able to maintain transient information about each individual request to be processed.

Controller 210 then invokes one of a plurality of handlers 217 for performing the information processing required for to meet the client's request. Once such processing is completed, controller 210 then invokes one of a plurality of views 219 for formatting the processed information and rendering the web page for presentation to the client.

In an exemplary embodiment, each web application that receives requests from web clients and presents dynamic content in response thereto requires a single controller for processing such requests. It is preferred that controller 210 runs as a servlet that is managed by an underlying servlet engine 220 (for example, IBM WebSphere). It is also preferred that controller 210 is stateless and fully supports multi-threading and/or multi-instance operation so that servlet engine 220 can drive multiple concurrent web page requests against a single instance of controller 210 on different threads.

Upon receiving a web page request, controller 210 invokes one of plurality of handlers 217 to perform the business processing required to present the requested web page. In an exemplary embodiment, system 2 includes one handler for each web page to be served by system 2. Accordingly, each of plurality of handlers 217 supports multi-threading because controller 210 creates only a single instance of each of plurality of handlers 217 and will therefore drive multiple requests from different users onto the same the same one of plurality of handlers 217 concurrently.

Each of plurality of handlers 217 performs any of a variety of processing tasks depending on the particular characteristics of the requested web page. One such task performed by handlers 217 is to validate any parameters provided by the client upon issuing the request. Parameter validation includes, for example, verifying that all required parameters were provided by the client and that all parameters have valid values or are within an expected range of values. If it is determined that any provided parameters are invalid, handlers 217 may take any suitable steps including, by way of non-limiting example, displaying to the client the same web page again with the field associated with the invalid parameter highlighted or forwarding the client to an error page that displays a detailed error message.

Each of plurality of handlers 217 also performs navigation validation to ensure that the client has arrived at the requested web page from a valid page. Navigation validation may be required, for example, for web pages that setup a conversational state over a series of pages. In order to perform navigation validation, knowledge of valid navigational paths are typically coded into those of handlers 217 that has navigation restrictions. For example, if one of handlers 217 detects that a user did not traverse a required sequence of pages before issuing the particular web page request but rather jumped to one of the pages within the sequence (other than the first page), then the one of handlers 217 may reject the request as invalid. In this case, the one of handlers 271 may take any corrective actions including, by way of non-limiting example, causing the user to be automatically forward to the first page in the expected sequence.

As a specific example, a client may access system 2 to purchase shares in a company. The process of purchasing shares requires the client to perform multiple steps including selecting the shares the client desires to buy, entering order information such as price, quantity, account, submitting the order and receiving the confirmation. This sequence forms a conversation requiring multiple request/reply steps each of which is a separate web-page. Thus, if the client successfully submits pages 1–N, page N+1 is displayed to the client until the end of the sequence is reached. Because web pages can be bookmarked individually, it is possible that the client may bookmark, for example, page 2 in the sequence in an attempt to return directly to this page at a later date. In this case, navigation validation performed by one of handlers 217 determines that page 2 in the sequence can only be displayed immediately following page 1 and therefore would reject the request.

In addition to the above functions, the one of handlers 217 invoked by controller 210 calls at least one of a plurality of content beans 215 for performing additional processing tasks to satisfy the web page request. The tasks performed by content beans 215 may include, for example, implementing business logic and performing parameter validation. In another example, one of content beans 215 provides and interface to content systems 213 and external systems 214 in order to retrieve/manipulate information necessary for the requested web page. (In the situation where one of content beans 215 is providing an interface to content systems 213 and external systems 214, parameter validation is not performed by the one of content beans 215 and the parameter validation performed by content systems 213 and external systems 214 is relied upon. Alternatively, parameter validation may be performed by one of handlers 217, as described above.)

Thus, each of handlers 217 calls only those of content beans 215 that are required to perform the business logic for the particular web page request for which the each of handlers 217 is responsible. Because content beans 215 include the routines necessary to perform the business logic for all web pages supported by the web application, each of handlers 217 only calls those of content beans 215 that are needed to perform the business logic associated with the particular web page. In this way, the business logic functions performed by content beans 215 are shared by all of handlers 217 and the need for handlers 217 to each include these functions is eliminated.

In an exemplary embodiment, content beans 215 are layered with each layer of content beans 215 providing a different level of business function. For example, a lowest layer of content beans 215 may provide a simple interface to content system 213 and external systems 214 by managing the actual request/response protocol for submitting operations to and maintaining the context that is necessary for communications with systems 213, 214. The lowest layer of content beans 215 may also perform any necessary data transformation to translate between the interfaces provided by systems 213, 214 and the interfaces used by the web application being operated by system 2. A higher layer of content beans 215 may combine some of content beans 215 belonging to a lower layer to perform more complex business operations. For example, a higher layer of content beans 215 that displays portfolio information to a client may invoke a first lower level of content beans 215 to retrieve the client's account balances, a second lower level of content beans 215 to retrieve the client's security holdings and a third lower level of content beans 215 to retrieve any pending trades/transfers. Still higher layers of content beans 215 may combine access to more than one content system 213 and external system 214 for presenting a unified business view for a particular operation across the underlying information sources. For example, higher layers of content beans 215 may perform an operation across a remote external system for core banking operations and a local database for static data retrieval.

As a specific example, displaying a valuation of a client's share holdings typically requires the combination of the results of at least the following operations performed by some of content beans 215: (i) the retrieval of a list of client share holdings from a core-banking source, (ii) the retrieval of the current market price for each holding from a market data source and (iii) if the client holdings are in different currencies, the retrieval from an FX source of an FX conversion rate from each currency to the valuation currency. In this case, a higher layer of content beans 215 may call lower layers of content beans 215 in order to perform these multiple operations across multiple sources.

In an exemplary embodiment, content beans 215 are constructed using the Java programming language. When one of content beans 215 needs to communicate with non-Java systems, then that one of content beans 215 may use standard Java APIs for communication.

Accordingly, by using content beans 215 as an interface for accessing sources of content, the content sources and the mechanisms required to access these sources may be changed without impacting the pages that require such content by simply updating the appropriate content beans 215 responsible for accessing such content sources.

After the data processing performed by content beans 215 is completed, the invoking one of handlers 217 constructs a model bean 218 and populates model bean 218 with the data retrieved from the content system by content beans 215. The function of model bean 218 is to hold the data that results from processing a web page request that is to be used to present the requested web page. The structure of model beans 218 is a Java class that is able to hold data elements inside, to 'set' these data elements to specific values, and then subsequently 'get' these values back out. The specific data that model bean 218 holds is determined by the business operation being performed and the data values resulting from this business operation that are to be displayed as a result. So for example, for an application in which an account transfer is to be made, model bean 218 typically holds at least the previous balance, the resulting balance and the name of the particular account.

In an exemplary embodiment, model bean 218 does not contain any business logic or formatting logic as these functions are performed by handlers 217 and views 219 (as will be described below). Furthermore, unlike controller 210, handlers 217 and views 219, model bean 218 need not support multi-threading because typically a separate instance of model bean 218 is created to hold the retrieved associated with each web page request. For example, for requests from different users that re being processes concurrently in different threads on the same one of handlers 217, each thread of the same one of handlers 217 creates an instance of model bean 218 for each thread for storing data associated with that particular thread.

Typically, each request has associated therewith one model bean 218 and all of the data resulting from the request is stored into this one model bean 218. In certain cases, however, such as when complex pages are requested or those maintaining conversational state, the invoking one of handlers 217 may create a plurality of model beans 218 for holding the retrieved data. The invoking one of handlers 217 then attaches model beans 218 to the current request context or, in the case of conversational state, to the session context. (The difference between attaching a model bean to a request context and a session context is that after the web page request is fulfilled, a model bean attached to the request context is automatically discarded by controller 210 whereas a model bean attached to the session context remains alive for the lifetime of the session, or until discarded by the web application.)

For example, multiple model beans 218 may be created is by one of handlers 217 that is invoked in a login process in which it is often the case that special processing is required and the one of handlers 217 may be required to place state information in a different model bean 218 for dedicated use by the login mechanism. Multiple model beans 218 are more commonly required in the case of a conversational state, such as the situation described above involving a client purchasing shares, in which details regarding which page was previously invoked for navigation validation is stored in a separate one of model beans 218 associated with a session context in order to maintain a conversational state.

Generally, once the data necessary for the requested web page is retrieved and stored in model bean 218, the one of handlers 217 returns control back to controller 210 which will then invoke one of views 219 for rendering and presenting the requested page to the user. In certain situations, however, as a result of processing the user's web page request, one of handlers 217 may determine that a different page should be forwarded to the user. In such a case, before returning control to controller 210, this 'forwarded' page is set by the one of handlers 217 and, on return to controller 210, controller 210 'chains' on to a different one of handlers 217 that is responsible for processing the data required for the forwarded page. The different one of handlers 217 then processes the forwarded page in a similar manner as described above and returns control to controller 210 when finished.

For example, if parameter validation performed by one of handlers 217 in response to a page request fails, then the one of handlers 217 may display the same web page again to the client having the field associated with the failing parameter highlighted. If parameter validation is successful, then the one of handlers 217 calls some of content beans 215 for performing the necessary business operations to retrieve the information required for the requested web page. If the business operations fail (for example, in the share purchase example described above, if there is insufficient funds in the account to buy the selected shares), then the one of handlers 217 may forward onto a diagnostic web page explaining why the operation could not be completed. If the business operation succeeds then the one of handlers 217 may forward onto a confirmation web page showing the result of completing the transaction.

The process by which the one of handlers 217 forwards onto a web page is as follows. First, the one of handlers 217 is invoked, performs parameter validation and then invokes one of content beans 215. The one of content beans 215 may then invoke a business operation against content system 213 and/or external system 214, as required. The one of content beans 215 then returns control back to the one of handlers 217 that retrieves information from the one of content beans 215 and stores the information into one of model bean 218. The one of handlers 217 then sets the 'next' page to be forwarded to and returns control to the controller 210. Upon receiving control, controller 210 sees that a 'next' page has been set and invokes the corresponding one of handlers 217 for that page. The corresponding one of handlers 217 performs its operations as required and eventually returns control to controller 210, this time without setting any further 'next' page. Controller 210 then sees that no next page is set and proceeds to have the web page displayed to the client, as will be described below.

Once the data processing is completed and model bean 218 is populated with the processed data, the one of handlers 217 returns control to controller 210. Controller 210 then invokes one of views 219 for rendering and presenting the web page to the client in response to the client's request. In an exemplary embodiment, each of views 219 supports one web page provided by the web application. Accordingly, controller invokes the one of views 219 that is responsible for rendering and presenting the request web page.

In order to render and present the requested page to the client, the one of views 219 extracts the data to be used in the web page from model bean 218 that was stored therein by one of handlers 215. After receiving the data, the one of views 219 invokes at least one of a plurality of view beans 216 for formatting and rendering the data into HTML for presentation to the client.

In an exemplary embodiment, view beans 216 are implemented in Java and perform various functions to format and render the data elements in the web page. For example, each web pages typically includes standard footers and headers (for e.g., a legal disclaimer and a corporate logo). In such a case one of view beans 216 would be used to render each of these elements so that these elements are uniformly displayed by different web pages and changes to these elements need only be made in a single location.

Because view beans 216 include the routines necessary to format all types of data objects supported by the web application, the one of views 219 only calls those of view beans 216 that are needed to render the data elements included in the web page for which the particular one of views 219 is responsible. By centralizing the formatting and rendering functions in view beans 216 and enabling all of views 219 to access view beans 216, the need for each of views 219 to incorporate these functions is eliminated and all web pages presented by the web application may have a uniform look-and-feel, as desired.

In an exemplary embodiment, views 219 are constructed using JSP technology and include static HTML together with standard "jsp" tags and embedded Java code that are used to generate dynamic content. The Java code may be invoked directly from views 219 by including it in a provided tag. Alternatively, custom jsp tags are used to invoke the Java code. It is also preferred that views 219 support multi-threading so that controller 210 can drive multiple requests from different clients against each of views 219 concurrently.

In another exemplary embodiment, view beans 216 render the web page in the foreign language selected by the client. The prior art method by which web applications typically support multiple languages is to store a version of each web page using text in each desired language. So, for example, if a particular web page includes as text labels the words "Client Name," "Account Number" and "Portfolio Activity," then a separate version of the web page is maintained each having the text labels in one of the languages that is to be supported by the web application. As the number of languages supported increases, the prior art approach becomes cumbersome.

To overcome the prior art limitations of having to store a version of every web page for each supported language, all text included in a web page layout is represented by a text label. For example, if a particular web page includes a disclaimer paragraph, the web page layout may include a "DISCLAIMER" label that indicates that the disclaimer paragraph to be included in the web page. When view beans 216 renders the particular web page for presentation to the client, view beans 216 receives from controller 210 the disclaimer text in the preferred language of the requesting client (as indicated in the user context) to insert into the web page. In this way, only one page layout is maintained for each web page supported by the web application and views beans 216 replaces the text labels with actual text in the appropriate language just before the web page is presented to the client.

In an exemplary embodiment, a language file 222 is included that stores the actual text replacement for each text label for each language supported by the web application. Language file 222 may be an external file in communications with controller 210 or may be embedded in controller 210.

In certain situations, one of handlers 217 may decide that it is more suitable to have a different one of views 219 present a particular web page and not the one of views 219 that normally presents the particular web page. In such a case, the one of handlers 217 indicates to controller 210 which of views 219 that controller 210 should invoke. This situation may arise when a web site allows a user to personalise the site by selecting one of a number of layouts to display their information. In this case, multiple views 219 is be formed one for each layout style. The one of handlers 217 checks the user's display preferences and then selects the one of multiple views 219 that corresponds to the user's preferred layout for a particular page.

In some situations, the one of handlers 217 actually renders the web page itself (for example, when the web page consists of a PDF file) in which case the one of handlers 217 indicates to controller 210 that none of views 219 are required and controller 210 should present the resulting web page to the client directly.

In an exemplary embodiment, system 2 includes a configuration file 221 in communications with content beans 215 for storing configuration information associated with each web page served by the web application. The configuration information contained in configuration file 221 may include, by way of non-limiting example, a list of the data objects that are to be included in each web page as well as the authorization information required to access each page. For example, a particular web page may include three data objects: a client name, an account balance and client portfolio details. For this web page, configuration file 221 stores in a record associated with the web page a reference to each of the three data objects. When the one of handlers 217 associated with the web page calls those of content beans 215 to process the data for the web page, those of content beans 215 receives the list of data objects that are to be included in the web page. Those of content beans 215 then retrieve the data objects contained in the list from content systems 213 and external systems 214. The benefit of storing a list of data objects for each web page in configuration file is that the contents of a web page can then be modified by simply changing the data object list for that web page included in the configuration file without having to modify and recode any of content beans 215 directly.

Configuration file 221 also includes web page authorization information that may be used by handlers 217 to determine whether a client request for a particular web page is authorized. Each supported web page has associated therewith an identifier for the business function that is performed by the page and each user is granted authorization to execute a certain set of these business functions. Configuration file 221 stores this information and upon receiving a user request for access to a business function the one of handlers 217 will access the authorization information to determine whether access should be granted. In certain cases, there may be more than one business function available on a particular web page in which case the one of handlers 217 ensures that a user requesting access to this multi-function page does not execute one of the functions for which the user is not authorized. Similarly, configuration file 221 stores for each web page an indication whether the page may be accesses by an user that is not authenticated (for example, a user browsing the site as a visitor that has not logged in with a user ID and password). If a web page is only to be accessed by authenticated users, then Controller 210 will prevent a user that is not authenticated from accessing the particular web page.

In an exemplary embodiment, configuration file is in communications with controller 210 so that when controller 210 invokes one of handlers 217, controller 210 also passes along the necessary authorization configuration information required by the one of handlers 217 and content beans 215.

Accordingly, a system is provided for serving dynamic content that improves the efficiency and reduces the overhead costs associated with prior art systems.

Based on the above description, it will be obvious to one of ordinary skill to implement the system and methods of the present invention in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Furthermore, alternate embodiments of the invention that implement the system in hardware, firmware or a combination of both hardware and software, as well as distributing modules and/or data in a different fashion will be apparent to those skilled in the art and are also within the scope of the invention. In addition, it will be obvious to one of ordinary skill to use a conventional database management system such as, by way of non-limiting example, Sybase, Oracle and DB2, as a platform for implementing the present invention.

It will thus be seen that the objects set forth above, among those made apparent from the preceding description, are efficiently attained and, since certain changes may be made in carrying out the above process, in a described product, and in the construction set forth without departing from the spirit and scope of the invention, it is intended that all matter contained in the above description shown in the accompanying drawing shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

The invention claimed is:

1. A system for presenting a requested web page selected from a plurality of web pages, comprising:
   a plurality of handlers, each of said plurality of handlers performing at least one processing task associated with one of said plurality of web pages;
   at least one layered content bean being invoked by any of said plurality of handlers for retrieving content required for the one of said plurality of web pages associated with said any of said plurality of handlers, wherein the at least one layered content bean is comprised of at least one lower layer content bean and a higher layer content bean, wherein the higher layer content bean is capable of implementing business logic;
   at least one model bean for storing said content, wherein the at least one model bean is constructed by a web server and wherein no business logic or formatting logic steps are implemented in the model bean;
   a plurality of views, each of said plurality of views associated with one of said plurality of web pages for receiving said content from said at least one model bean and for presenting the one of said plurality of web page;
   at least one view bean being invoked by any of said plurality of views for rendering the one of said plurality of web pages; and
   a controller for receiving a request for said requested web page;
   wherein when said controller receives said request, said controller invokes the one of said plurality of handlers associated with said requested web page for processing content required for said requested web page and said controller invokes the one of said plurality of views for presenting said requested web page, and wherein the plurality of handlers, at least one layered content bean, at least one model bean, plurality of views, at least one view bean, and the controller, are executed on the web server.

2. The system of claim 1, wherein said request for said requested web page includes at least one parameter and said at least one processing task preformed by at least one of said plurality of handlers includes validating said at least one parameter.

3. The system of claim 1, wherein said request for said requested web page is subsequent to a navigation and said at least one processing task performed by at least one of said plurality of handlers includes validating said navigation.

4. The system of claim 1, wherein at least one of said plurality of handlers directs said controller to cause a different web page to be presented.

5. The system of claim 1, wherein at least one of said plurality of handlers directs said controller to invoke a different one of said plurality of views for presenting said requested web page.

6. The system of claim 1, wherein at least one of said handlers renders the requested web page.

7. The system of claim 6, wherein said controller presents the requested of web page.

8. The system of claim 1, wherein each of said plurality of handlers is multithreaded.

9. The system of claim 1, wherein said at least one content bean receives content from at least one external system.

10. The system of claim 9, wherein said system has a first interface and said external system has a second interface and said at least one content bean translates between said first interface and said second interface.

11. The system of claim 1, further comprising a plurality of content beans each having a function and wherein said functions of said plurality of content beans are layered.

12. The system of claim 1, further comprising a configuration file, said configuration file including a list of data objects for at least one of said plurality of web pages, and wherein said at least one content bean receives said list of data objects and retrieves said data objects in said list for inclusion in said at least one of said plurality of web pages.

13. The system of claim 12, wherein said at least one of said plurality of web pages is modified by modifying said list of data objects.

14. The system of claim 12, wherein said configuration file includes authorization requirements for said requested web page, and wherein said handler verifies that said request for said requested web page satisfies said authorization requirements.

15. The system of claim 1, wherein each of said plurality of views is multithreaded.

16. The system of claim 1, wherein each of said plurality of views is formed using JSP technology.

17. The system of claim 1, wherein said at least one view bean formats the one of said plurality of web pages into HTML.

18. The system of claim 1, further comprising a language file storing text in a plurality of languages, said text being associated with a text label, and wherein at least one of said plurality of web pages includes said text label and said at least one view bean replaces said text label with said associated text in a selected one of said plurality of languages.

19. A method for presenting a requested web page selected from a plurality of web pages, comprising the steps of:
performing at least one processing task associated with said requested web page;
invoking at least one layered content bean for retrieving content required for said requested web page, wherein the at least one layered content bean is comprised of at least one lower layer content bean and a higher layer content bean, wherein the higher layer content bean is capable of implementing business logic;
storing said content required for said requested web page in at least one model bean, wherein the at least one model bean is constructed by a web server and wherein no business logic or formatting logic steps are implemented in the model bean;
receiving said content from said at least one model bean;
invoking at least one view bean for rendering said requested web page; and
presenting said requested web page including said content, wherein the at least one layered content bean, at least one model bean, and at least one view bean are executed on the web server.

20. The method of claim 19, wherein said request for said requested web page includes at least one parameter and the step of performing at least one processing task includes the step of:
validating said at least one parameter.

21. The method of claim 19, wherein said request for said requested web age is subsequent to a navigation and the step of performing at least one processing task includes the step of:
validating said navigation.

22. The method of claim 19, further comprising the step of:
directing a different web page to be presented.

23. The method of claim 19, wherein said at least one content bean receives content from at least one content system.

24. The method of claim 23, wherein said at least one content bean executes on a system having a first interface and said content system has a second interface and wherein the step of invoking at least one content bean for retrieving content includes the step of:
translating between said first interface and said second interface.

25. The method of claim 19, further comprising a plurality of content beans each having a function and wherein said functions of said plurality of content beans are layered.

26. The method of claim 19, further comprising a configuration file, said configuration file including a list of data objects for said requested web page, and wherein the stop of invoking at least one content bean for retrieving content required includes the steps of:
receiving said list of data objects; and
retrieving said data objects in said list of inclusion in said requested web page.

27. The method of claim 26, further comprising the step of:
modifying said requested web page by modifying said list of data objects.

28. The method of claim 26, wherein said configuration file includes authorization requirements for said requested web page, said method further comprising the step of:
verifying that said request for said requested web page satisfies said authorization requirements.

29. The method of claim 19, wherein the step of invoking at least one view bean for rendering said requested web page includes the step of:
formatting said requested web page into HTML.

30. The method of claim 19, further comprising a language file storing text in a plurality of languages, said text being associated with a text label, wherein said requested web page includes said text label, and wherein the step of invoking at least one view bean for rendering said requested web page includes the step of:
replacing said text label with said associated text in a selected one of said plurality of languages.

31. A system for presenting a requested web page selected from a plurality of web pages, comprising:
a plurality of handlers, one of said plurality of handlers performing at least one processing task associated with said requested web page;

at least one layered content bean being invoked by said one of said plurality of handlers for retrieving content required for said requested web page, wherein the at least one layered content bean is comprised of at least one lower layer content bean and a higher layer content bean, wherein the higher layer content bean is capable of implementing business logic;

at least one model bean for storing said content, wherein the at least one model bean is constructed by a web server and wherein no business logic or formatting logic steps are implemented in the model bean;

a plurality of views, one of said plurality of views associated with said requested web page for receiving said content from said at least one model bean and for presenting said requested web page;

at least one view bean being invoked by said one of said plurality of views for rendering said requested web page; and a controller for receiving a request for said requested web page, wherein when said controller receives said request, said controller invokes said one of said plurality of handlers and said one of said plurality of views, and wherein the plurality of handlers, at least one layered content bean, at least one model bean, plurality of views, at least one view bean, and the controller are executed on the web server.

\* \* \* \* \*